United States Patent
Sohn et al.

(10) Patent No.: US 9,601,731 B2
(45) Date of Patent: Mar. 21, 2017

(54) BATTERY CASE

(71) Applicant: EVTEC CO., LTD., Osan-si, Gyeonggi-do (KR)

(72) Inventors: Il Seon Sohn, Seongnam-si (KR); Kyu Seon Shon, Seoul (KR)

(73) Assignee: EVTEC CO., LTD., Gyeonggi-Do (KR)

( * ) Notice: Subject to any disclaimer, the term of this patent is extended or adjusted under 35 U.S.C. 154(b) by 53 days.

(21) Appl. No.: 14/760,644

(22) PCT Filed: Dec. 30, 2013

(86) PCT No.: PCT/KR2013/012392
§ 371 (c)(1),
(2) Date: Jul. 13, 2015

(87) PCT Pub. No.: WO2014/112732
PCT Pub. Date: Jul. 24, 2014

(65) Prior Publication Data
US 2015/0357614 A1    Dec. 10, 2015

(30) Foreign Application Priority Data
Jan. 16, 2013 (KR) .................. 10-2013-0004987

(51) Int. Cl.
*H01M 2/02* (2006.01)
*H01M 2/10* (2006.01)
(Continued)

(52) U.S. Cl.
CPC ............. *H01M 2/1072* (2013.01); *B60K 1/04* (2013.01); *H01M 2/02* (2013.01); *H01M 2/10* (2013.01);
(Continued)

(58) Field of Classification Search
CPC ........ H01M 2/1072; H01M 2/02; H01M 2/10; H01M 10/613; H01M 10/6566;
(Continued)

(56) References Cited

U.S. PATENT DOCUMENTS

2003/0096160 A1* 5/2003 Sugiura ............... H01M 2/1022
429/120
2009/0141447 A1* 6/2009 Soma ..................... B60K 6/445
361/694

(Continued)

FOREIGN PATENT DOCUMENTS

| KR | 20-0151722 Y1 | 7/1999 |
| KR | 10-2009-0091942 A | 8/2009 |
| KR | 10-1051446 A | 1/2011 |

OTHER PUBLICATIONS

International Search Report issued in corresponding PCT/KR2013/012392 on Apr. 20, 2014.

*Primary Examiner* — Cynthia K Walls
(74) *Attorney, Agent, or Firm* — Roberts Mlotkowski Safran Cole & Calderon P.C.

(57) ABSTRACT

The present invention relates to a battery case for a vehicle, and more particularly to a battery case for effectively lowering or raising the temperature of a battery module consisting of a plurality of batteries used in a vehicle or mechanical apparatus. According to the present invention, a battery case includes: a lower frame with an upper open part; a lower plate fixed to the lower frame for holding the battery module thereon, the lower plate being formed lengthwise with an inlet hole, an outlet hole, and a heat exchange hole; an inner upper frame with an upper surface having a terminal through-hole for enclosing the battery module; a front frame attached to an open front of the inner upper frame for holding a suction fan at the lower part thereof; an outer upper frame with an upper surface having a terminal
(Continued)

through-hole for enclosing the inner upper frame and the front frame; a rear plate attached to the rear of the outer upper frame for holding an exhaust fan; and a guide partition wall arranged in the side of the inner upper frame so as to closely contact the battery module, characterized in that the guide partition wall guides the cooling (heating) air sucked by the suction fan along a zigzag path from the lower part of the side of the battery module to the upper part thereof to the exhaust fan.

12 Claims, 7 Drawing Sheets

(51) Int. Cl.
*H01M 10/625* (2014.01)
*H01M 10/615* (2014.01)
*H01M 10/6563* (2014.01)
*H01M 10/6566* (2014.01)
*H01M 10/613* (2014.01)
*B60K 1/04* (2006.01)
*B60K 11/06* (2006.01)
*B60K 1/00* (2006.01)

(52) U.S. Cl.
CPC ....... *H01M 10/613* (2015.04); *H01M 10/615* (2015.04); *H01M 10/625* (2015.04); *H01M 10/6563* (2015.04); *H01M 10/6566* (2015.04); *B60K 11/06* (2013.01); *B60K 2001/005* (2013.01); *H01M 2220/20* (2013.01)

(58) Field of Classification Search
CPC .......... H01M 10/6563; H01M 10/625; H01M 10/615; H01M 2220/20; B60K 1/04; B60K 2001/005; B60K 11/06
See application file for complete search history.

(56) References Cited

U.S. PATENT DOCUMENTS

2012/0263983 A1 10/2012 Yoon et al.
2013/0216875 A1 8/2013 Kim et al.

* cited by examiner (a)

(b)

(a)

(b)

BATTERY CASE

CROSS-REFERENCE TO RELATED APPLICATIONS

The present application is a U.S. National Phase of PCT/KR2013/012392 filed on Dec. 30, 2013 claiming priority to Korean Patent application No. 10-2013-0004987 filed Jan. 16, 2013. The disclosure of the PCT Application is hereby incorporated by reference into the present Application.

TECHNICAL FIELD

The present invention relates to a battery case, and more particularly to a battery case capable of safely protecting a battery module from external impacts and of effectively lowering or raising the temperature of the battery module in a vehicle or mechanical apparatus, etc., which uses the battery module formed by combining in series or in parallel a plurality of batteries.

BACKGROUND ART

The increase of a vehicle using fossil fuel like gasoline, diesel or the like causes serious energy problems due to the rapid increase of demand for the fossil fuel. Also, the increase of the vehicle brings about not only both the environmental pollution due to excess emission of carbon dioxide and environmental problems like the increase of greenhouse gas concentrations, etc., but also various economic problems caused by rapid fluctuation in the price due to an imbalance between supply and demand, etc.

To solve the problems, active technical developments are made, which improves a fuel efficiency through being lighter and high efficiency or replaces the fossil fuel with green energy in the automotive industry.

A technology for replacing the fossil fuel with green energy is now the most actively applied to the development of an electric vehicle or a hybrid vehicle, etc. The electric vehicle or hybrid vehicle has been partially commercialized.

A secondary battery which can be reused by being charged is used as a main power source or an auxiliary power source of the electric vehicle or the hybrid vehicle. The secondary battery is used as the main power source or the auxiliary power source in such a manner that a battery module obtained by generally combining a plurality of the secondary batteries in series or in parallel is received or fixed in a box-shaped case or tray and is mounted on the electric vehicle, etc. Here, a lithium secondary battery is mainly used as the secondary battery.

The efficiency and performance of the battery module which is used in the electric vehicle, etc., depend greatly on a temperature. For example, when the battery is discharged at a high temperature, the lifespan of the battery is remarkably reduced. At a low temperature, the charging/discharging performance of the battery is degraded until the temperature reaches an appropriate temperature range required by the battery.

Accordingly, various tries are being made to appropriately maintain the current temperature of the battery module. One of the tries is a battery case (hereafter, referred to as a conventional battery case) disclosed in the Korean Patent number 10-1051446.

As shown in FIG. 1, the conventional battery case includes an inner case 10, an outer case 20, an elastic member 30 and a cooling fan 40. A battery module "P" obtained by combining a plurality of batteries in series or in parallel is received in the inner case 10.

The inner case 10 which has received the battery module "P" is received in the outer case 20. The outer case 20 is comprised of a control part installation portion 21 and a space for receiving the inner case 10. Control parts are installed in the control part installation portion 21. The cooling fan 40 for supplying cooling air to the space in which the inner case 10 has been received is installed on the front of the outer case 20, in which the control part installation portion 21 has been provided. Another cooling fan 40 for discharging the cooling air to the outside is installed on the rear of the outer case 20, on which the space for receiving the inner case 10 has been provided.

Meanwhile, in the conventional battery case, the elastic member 30 like a leaf spring is installed on the inner wall surface of the outer case 20, that is, the upper and lower surfaces and both inner sides respectively. When the inner case 10 which has received the battery module "P" is mounted, the outer surface of the inner case 10 comes in close contact with the middle portion of the elastic member 30 and is elastically supported.

Accordingly, the inner case 10 which has received the battery module "P" is elastically supported within the outer case 20 by the elastic member 30, so that vibration or impact which is applied to the outer case 20 can be prevented from being directly transmitted to the inner case 10. Simultaneously, the cooling air flows through a gap generated by the fact that the inner case 10 is spaced from the inner wall surface of the outer case 20 by the elastic member 30, so that the battery module "P" can be cooled.

DISCLOSURE

Technical Problem

However, in the conventional battery case, the battery module "P" can be only cooled. For this reason, when the temperature of the battery module "P" is reduced below an appropriate temperature, the battery module "P" cannot be heated.

Also, although the battery module "P" can be elastically supported, the battery module "P" and the inner case 10 receiving the battery module "P" are hereby shaken even by little vibration or impact. As a result, when the conventional battery case is used in a vehicle which frequently generates vibration while being driven, it is quite probable that short-circuit is generated in an electric system connected to the battery module "P".

Also, due to the weight of the battery module "P" and the weight of the inner case 10, a large load is added to the elastic member 30 installed on the lower wall surface of the outer case 20. Contrary to this, a relatively small load is added to the elastic member 30 installed on the wall surfaces of both sides or the upper wall surface. Therefore, the inner case 10 is difficult to be supported and balanced, and thus, there are differences between the gaps generated by the fact that the outer case 20 is spaced from the lower portion, both side portions and upper portion of the inner case 10, so that the amount of the cooling air flowing through the gaps is not uniform. As a result, a cooling efficiency is not uniform according to the portion of the inner case 10.

The elastic member 30 is respectively installed in the gaps generated by the fact that the outer case 20 is spaced from the lower portion, both side portions and upper portion of the inner case 10. Accordingly, the elastic member 30 is an obstacle to the cooling air flowing through the gaps, so that the smooth flow of the cooling air is interrupted, for example, occurrence of turbulence, etc. As a result, the cooling efficiency is degraded.

Therefore, in order to solve the problems of the conventional battery case, the present invention provides a battery case capable of selectively cooling or heating the battery module, of securely fixing the battery module and of safely protecting the battery module from strong external impact.

Also, the present invention provides a cooling (heating) structure allowing the air sucked into the battery case to easily cool or heat the entire surface of the battery module, thereby improving the cooling efficiency or heating efficiency. The present invention provides a double insulation structure of the battery module, so that the battery module is less affected by an outside temperature.

Technical Solution

To overcome the technical problems, the battery case according to the embodiment of the present invention includes:

a lower frame with an upper open part;

a lower plate fixed to the lower frame for holding the battery module thereon, the lower plate being formed lengthwise with an inlet hole, an outlet hole, and a heat exchange hole;

an inner upper frame with an upper surface having a terminal through-hole for enclosing the battery module;

a front frame attached to an open front of the inner upper frame for holding a suction fan at the lower part thereof;

an outer upper frame with an upper surface having a terminal through-hole for enclosing the inner upper frame and the front frame; and a rear plate attached to the rear of the outer upper frame for holding an exhaust fan;

and the battery case further includes a guide partition wall arranged in the side of the inner upper frame so as to closely contact the battery module, characterized in that the guide partition wall guides cooling (heating) air sucked by the suction fan along a zigzag path from the lower part of the side of the battery module to the upper part thereof to the exhaust fan.

In the front frame, a heater is installed in the rear of the suction fan, and the air sucked from the suction fan is selectively heated.

When the side of the battery module is divided into a lower portion, a middle portion and an upper portion from the bottom to the top thereof, the guide partition wall includes a first guide partition wall and a second guide partition wall. The first guide partition wall separates the lower portion and the middle portion. The second guide partition wall separates the middle portion and the upper portion.

The cooling (heating) air cools (heats) sequentially the side of the battery module through a first side flow, a second side flow, and a third side flow. The first side flow is that the cooling (heating) air flows to the rear through a path among the first guide partition wall, the lower plate, and the lower side of the battery module.

The second side flow is that the cooling (heating) air which has gone through the first side flow flows from the rear side of the battery module to the front through a path between the first and second guide partition walls and the middle portion of the side of the battery module.

The third side flow is that the cooling (heating) air which has gone through the second side flow flows from the front side of the battery module to the rear through a path among the second guide partition wall, the upper surface of the inner upper frame, and the upper side of the battery module.

The longitudinal front end of the first guide partition wall is formed protruding more than the front of the battery module. The longitudinal rear end of the first guide partition wall is spaced from the rear of the battery module at a certain interval.

The longitudinal rear end of the second guide partition wall is formed protruding more than the rear of the battery module. The longitudinal front end of the second guide partition wall is spaced from the front of the battery module at a certain interval.

A portion of the cooling (heating) air sucked from the suction fan flows into a path between the lower plate and the lower frame through the inlet hole formed in the lower plate, and cools (heats) the lower surface of the battery module through the heat exchange hole.

A portion of the cooling (heating) air flows into a path formed between the sides of the inner upper frame and the battery module and the first guide partition wall.

The suction fan and a control part installation portion are formed on the upper portion and the lower portion respectively.

The rear of the control part installation portion is spaced from the front of the battery module. A first shielding partition wall is formed on either the front frame or the control part installation portion. The first shielding partition wall finishes closely between the protruding ends of the first guide partition wall.

A second shielding partition wall is formed on the inner rear of the inner upper frame. The second shielding partition wall finishes closely between the protruding ends of the second guide partition wall.

The cooling (heating) air cools (heats) the lower front of the battery module in an impact cooling (heating) chamber which is formed by the rear of the suction fan, the first shielding partition wall, and the front of the battery module.

The cooling (heating) air which has cooled (heated) the lower front of the battery module goes through the first side flow and passes through the inlet hole of the lower plate, and then cools (heats) the lower side and lower surface of the battery module.

The cooling (heating) air which has cooled (heated) the lower surface of the battery module is discharged between the battery module and the rear plate through the outlet hole of the lower plate, and then rises to the second guide partition wall, so that the rear of the battery module is cooled.

The cooling (heating) air which has cooled (heated) the lower side of the battery module joins with the cooling (heating) air rising through the outlet hole of the lower plate, and then goes through the second side flow along a path between the first guide partition wall and the second guide partition wall.

A portion of the cooling (heating) air which has gone through the second side flow cools (heats) the front middle portion and the upper portion of the battery module, and then flows to the rear along a path between the upper surface of the inner upper frame and the upper surface of the battery module.

A portion of the cooling (heating) air which has gone through the second side flow goes through the third side flow to the upper side of the battery module.

The cooling (heating) air which has gone through the third side flow cools the upper side and rear of the battery module, and then is discharged through the exhaust fan.

Advantageous Effects

According to the embodiment of the present invention, the present invention provides a structure in which the cooling (heating) air is capable of cooling (heating) the front, both sides, upper surface, lower surface and rear of the battery module, thereby more improving the cooling efficiency or heating efficiency.

Also, the battery module can be securely fixed in the battery case by a lower plate and an inner upper case, etc. The battery module is wholly enclosed in a double structure by the inner upper case and outer upper case, the lower plate and lower frame, and the front frame and rear frame, so that the battery module can be safely protected from strong external impact.

Also, a heater is installed in the rear of a suction fan which sucks the air into the battery case from the outside. Accordingly, when the temperature of the battery module is reduced below an appropriate temperature, the heater is selectively operated, and then the battery module can be heated.

MODE FOR INVENTION

Hereafter, a battery case according to an embodiment of the present invention will be described in detail with reference to the accompanying drawings. For reference, in the following description and claims, the front and rear, and the forward and backward direction refer respectively to a surface and a direction which are located at the upstream and downstream respectively on the basis of the flow direction of the cooling (heating) air. The longitudinal direction refers to a direction along the flow direction of the cooling (heating) direction. Also, the air is divided into the cooling air and heating air according to whether the air sucked into the battery case is heated or not. The cooling (heating) air is used to commonly designate the cooling air and the heating air. This will be applied in the same manner to the following description and claims.

Figure 1:
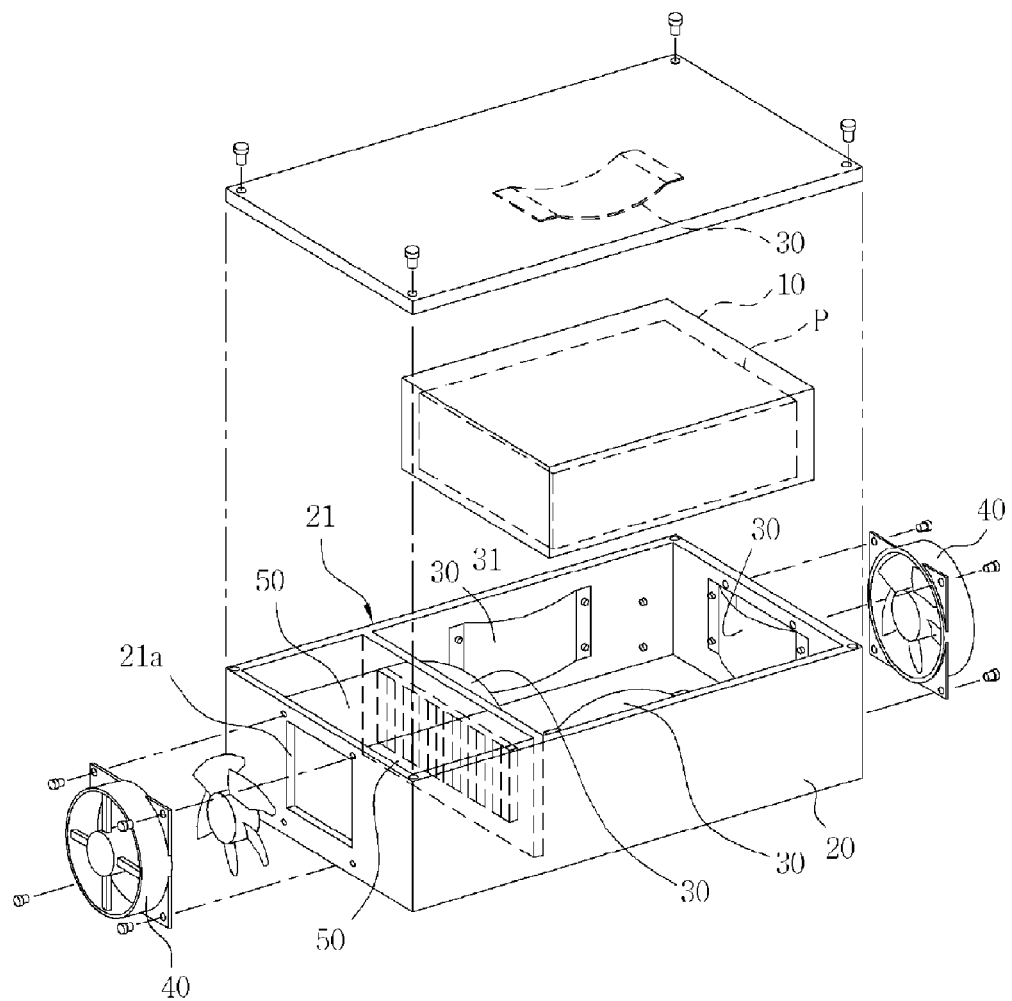
FIG. 1 is an exploded perspective view of a conventional battery case.
Figure 2:
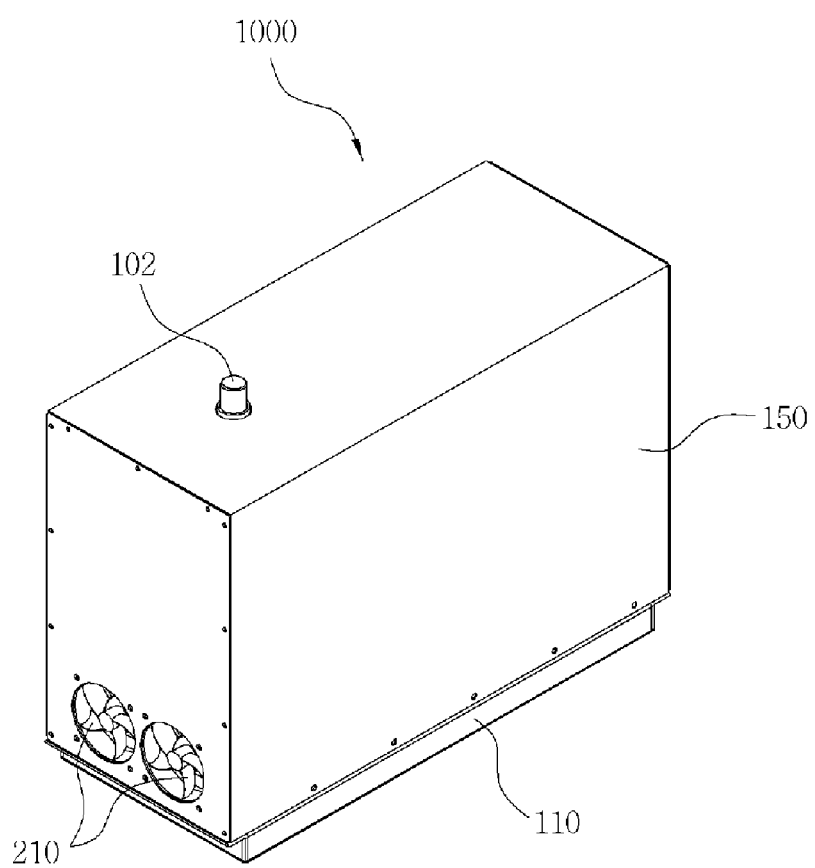
FIG. 2 is a perspective view of a battery case according to an embodiment of the present invention.
Figure 3:
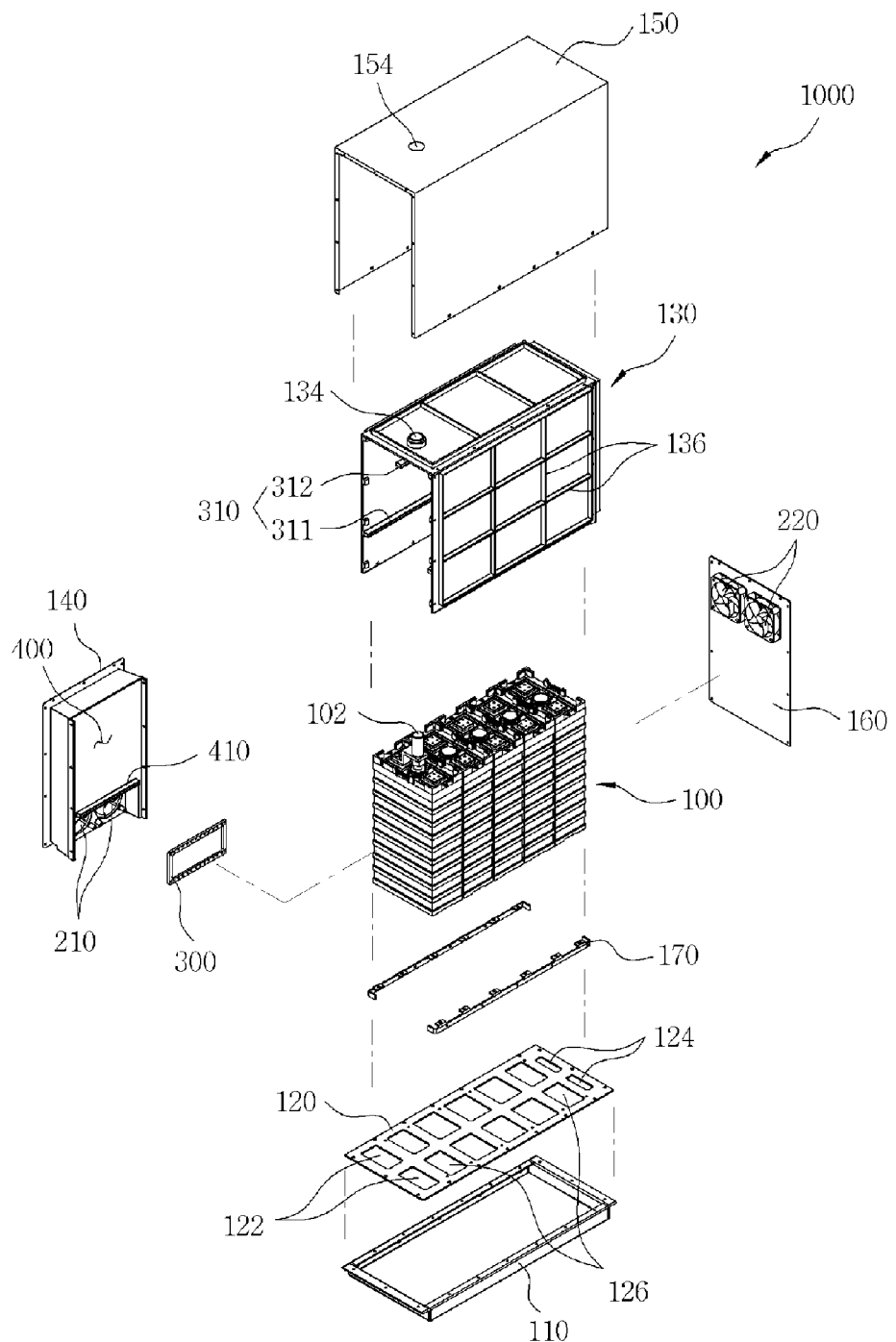
FIG. 3 is an exploded perspective view of FIG. 2.

The outside of a battery case 1000 according to an embodiment of the present invention is, as show in FIG. 2, enclosed by a lower frame 110 and an outer upper frame 150. A suction fan 210 and an exhaust fan 220 (see FIGS. 2 and 3) are installed on the front and rear of the outer upper frame 150 respectively. A +/−terminal 102 of a below-described battery module 100 is disposed to protrude on the upper surface of the outer upper frame 150.

The battery case 1000 according to the embodiment of the present invention will be described in more detail with reference to FIGS. 3 to 6. The lower frame 110 constitutes the lower portion of the battery case 1000. The lower frame 110 has a quadrangular box shape with an upper open part. A bent flange is provided in the edge of the lower frame 110 so as to fix a below-described lower plate 120. Here, it is just an example that the lower frame 110 has a quadrangular box shape. There is no limit to this.

The lower plate 120 is fixed on the lower frame 110 by a conventional fastening means (not shown). At least one inlet hole 122 and at least one outlet hole 124 are respectively formed close to the front and rear of the lower plate 120. A plurality of heat exchange holes 126 are formed between the inlet hole 122 and the outlet hole 124 in the longitudinal direction and the width direction of the lower plate 120.

The battery module 100 obtained by combining a plurality of batteries in series or in parallel is fixed on the lower plate 120. In the embodiment, in a state where a pair of fixing brackets 170 formed in the longitudinal direction of the battery module 100 is in contact with both sides of the lower portion of the battery module 100, the fixing brackets 170 are fastened and fixed to the upper surface of the lower plate 120 by a conventional fastening means (not shown). However, this configuration is just an example of the present invention. For example, it is possible that the fixing bracket 170 is integrally formed with the lower plate 120, and then the battery module 100 is fixed.

After the batter module 100 is fixed to the lower plate 120 as described above, the outside of the batter module 100 is enclosed by an inner upper frame 130 and is fixed by a fastening means.

Figure 4:
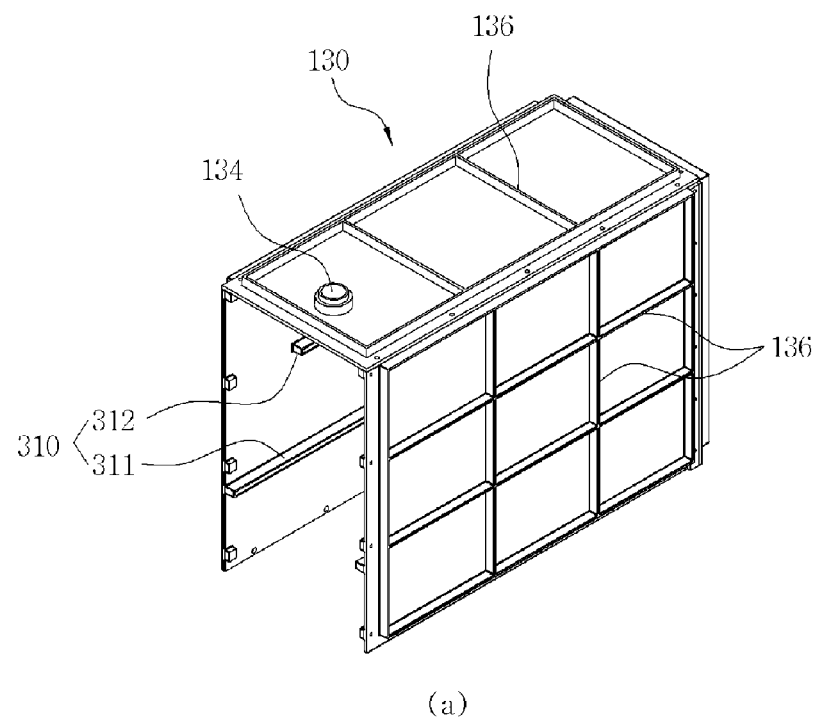
FIG. 4 is a perspective view of an inner upper frame of FIG. 3 and a front perspective view of the inner upper frame is shown in (a) and a rear perspective view of the inner upper frame is shown in (b)
Figure 4:
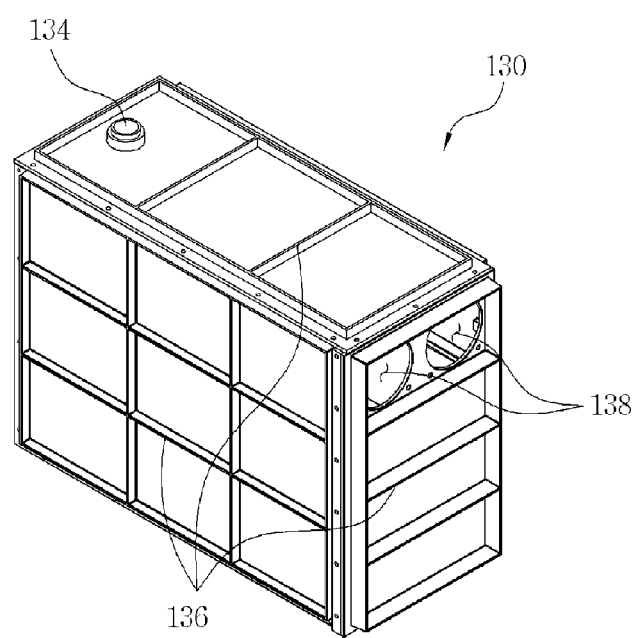
Figure 5:
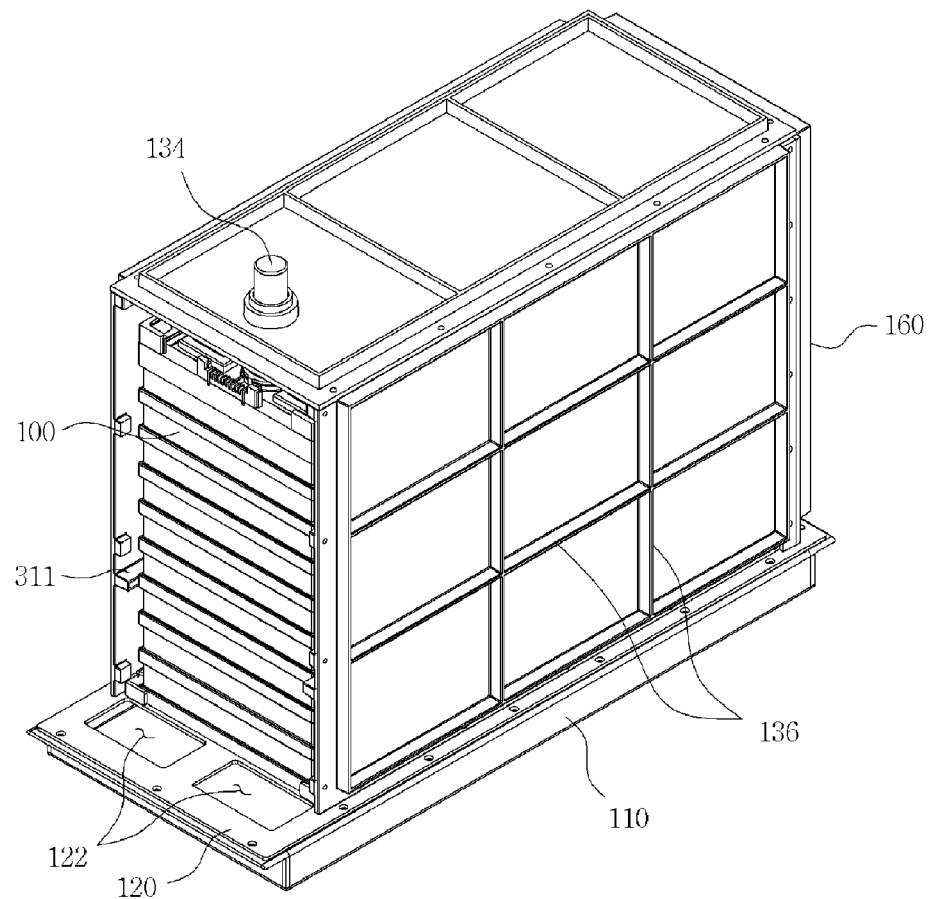
FIG. 5 is a perspective view of the battery case without an outer upper frame and a front frame of FIG. 3.

Here, the inner upper frame 130 encloses, as shown in (a) and (b) of FIG. 4 and FIG. 5, both sides, upper surface, and rear of the battery module 100. The front of the inner upper frame 130 is open.

The inner upper frame 130 will be described on the basis of battery module 100. The both sides, upper surface, and rear of the inner upper frame 130 are spaced from the battery module 100 at a certain interval, so that a path through which the cooling (heating) air flows is provided. A fan through-hole 138 into which the exhaust fan 220 discharging the cooling (heating) air to the outside is inserted is formed in the upper portion of the rear of the inner upper frame 130. A terminal through-hole 134 through which the +/−terminal 102 of the battery module 100 passes is formed on the upper surface of the inner upper frame 130.

Also, A guide partition wall 310 is included on the side of the inner upper frame 130. The guide partition wall 310 comes in close contact with the battery module 100, characterized in that the guide partition wall guides the cooling (heating) air sucked from the suction fan 210 along a zigzag path from the lower part of the side of the battery module 100 to the upper part thereof to the exhaust fan 220.

That is, the guide partition wall 310 is further formed on the inner upper frame 130, so that the path is formed between the inner upper frame 130 and the side of the battery module 100. As a result, the cooling (heating) air cools (heats) the side of the battery module 100 while flowing in the form of a zigzag, thereby more effectively lowering or raising the temperature of the battery module 100.

When the side of the battery module 100 is divided into a lower portion, a middle portion and an upper portion from the bottom to the top thereof, the guide partition wall 310 includes a first guide partition wall 311 and a second guide partition wall 312. The first guide partition wall 311 separates the lower portion and the middle portion. The second guide partition wall 312 separates the middle portion and the upper portion.

It is desirable that two of the first and second guide partition walls 311 and 312 should be disposed on the upper and lower portions of the side of the inner upper frame 130 respectively. Further, four guide partition walls may be disposed.

In other words, if four of the first and second guide partition walls 311 and 312 are disposed, the path of the cooling (heating) air which cools the side of the battery module 100 is lengthened. Accordingly, the cooling (heating) efficiency is reduced due to heat exchange with the battery module 100.

Also, on the basis of the path between the guide partition wall 310 and the side of the battery module 100, the cooling (heating) air cools (heats) sequentially the side of the battery module 100 through a first side flow, a second side flow, and a third side flow. The first side flow means that the cooling (heating) air flows to the rear through the path among the first guide partition wall 311, the lower plate 120, and the lower side of the battery module 100. The second side flow means that the cooling (heating) air which has gone through the first side flow flows from the rear side of the battery module to the front through the path between the first and second guide partition walls 311 and 312 and the middle portion of the side of the battery module 100. The third side flow means that the cooling (heating) air which has gone through the second side flow flows from the front side of the battery module 100 to the rear through the path among the second guide partition wall 312, the upper surface of the inner upper frame 130, and the upper side of the battery module 100.

The longitudinal front end of the first guide partition wall 311 is formed protruding more than the front of the battery module 100. The longitudinal rear end of the first guide partition wall 311 is spaced from the rear of the battery module 100 at a certain interval. The longitudinal rear end of the second guide partition wall 312 is formed protruding more than the rear of the battery module 100. The longitudinal front end of the second guide partition wall 312 is spaced from the front of the battery module 100 at a certain interval.

Meanwhile, a rib 136 is formed protruding on the outer side, upper surface and rear of the inner upper frame 130 so as to reinforce of the rigidity of the inner upper frame 130. The ribs 136 formed on the outer side and upper surface contact with the inner side which corresponds to the below-described outer upper frame 150, and then maintain the interval between the inner upper frame 130 and the outer upper frame 150. The ribs 136 formed on the rear contact with the inner rear which corresponds to a below-described rear plate 160, and then contributes to maintain the interval between the inner upper frame 130 and the rear plate 160.

Figure 6:
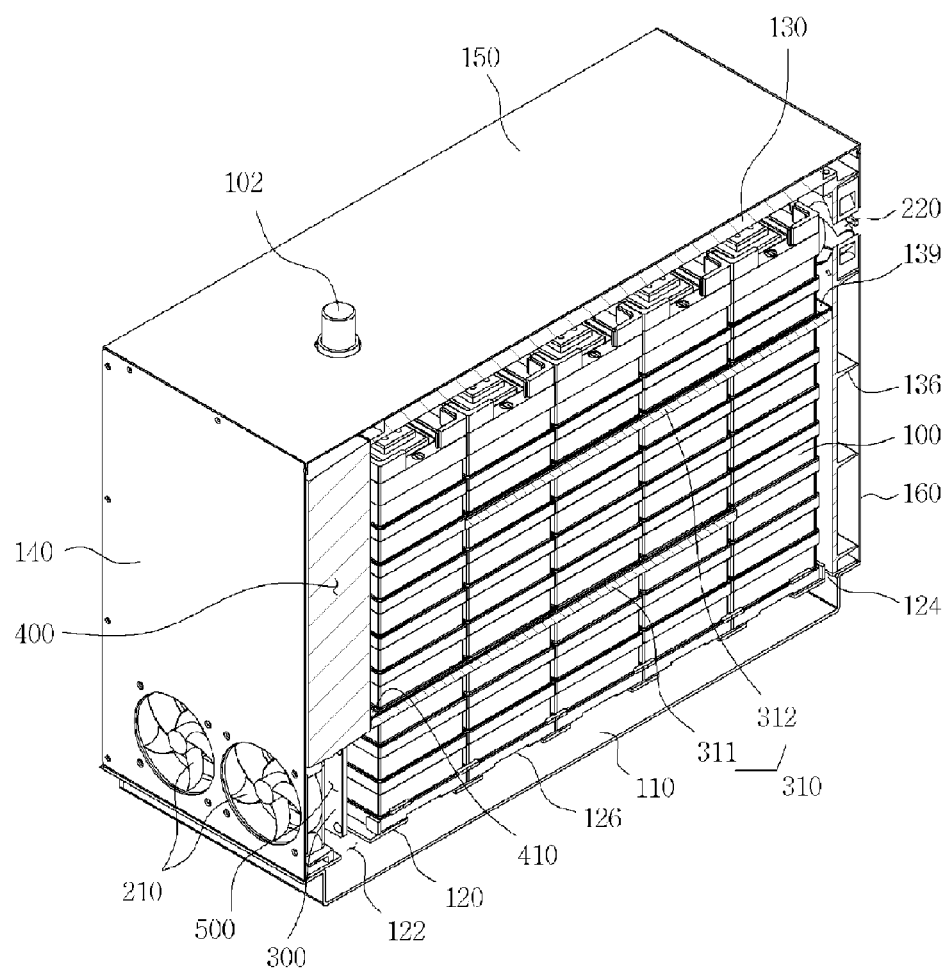
FIG. 6 is a perspective view showing a state where the battery case of FIG. 2 has been partially cut in a flow direction of cooling (heating) air.

As shown in FIG. 6, a front frame 140 is installed on the open front of the inner upper frame 130. At least one suction fan 210 which sucks the outside air into the battery case 1000 is installed on the lower front of the front frame 140. A control part installation portion 400 which has an open front and a box shape is provided on the suction fan 210. Various control parts which measure the temperature of the battery module 100, control the operations of the suction fan 210 and the exhaust fan 220 and control a below-described heater 300, etc., are installed in the control part installation portion 400. It is desirable that the control parts should be mounted on a PCB and modularized.

Here, in the front frame 140, it is desirable that the heater 300 is installed in the rear of the suction fan 210. The heater 300 heats the air sucked by the suction fan 210. It can be considered that the heater 300 is formed in the form of a hot wire. The heater 300 is selectively operated when the temperature of the battery module 100 is reduced below an appropriate temperature.

The rear of the control part installation portion 400 is spaced from the front of the battery module 100 at a certain interval, so that a path is formed which allows the cooling (heating) air to convection cool the front of the battery module 100 and to flow to the upper portion during a process in which the cooling (heating) air of an impact cooling (heating) chamber 500 moves along the guide partition wall 310. A first shielding partition wall 410 is formed on either the front frame 140 or the control part installation portion 400. A second shielding partition wall 139 is formed on the inner rear of the inner upper frame 130. The first shielding partition wall 410 finishes closely between the protruding ends of the first guide partition wall 311. The second shielding partition wall 139 finishes closely between the protruding ends of the second guide partition wall 312.

That is, the first shielding partition wall 410 and the second shielding partition wall 139 prevent that the cooling (heating) air sucked from the suction fan 210 rises directly above the front of the batter module 100 or flows out from the outlet hole 124 and rises along the rear of the battery module 100 and then flows to the exhaust fan 220.

Meanwhile, the open front of the inner upper frame 130 is finished by the front frame 140. The rear space of the suction fan 210 of the front frame 140 is formed by either the lower surface of the control part installation portion 400 or the first shielding partition wall 410 and the front of the battery module 100. The space corresponds to the impact cooling (heating) chamber 500 where the air sucked by the suction fan 210 impacts the front of the battery module 100 and is cooled or heated.

Therefore, the cooling (heating) air of the impact cooling (heating) chamber 500 is not moved above the front of the battery module 100 by first shielding partition wall 410. A portion of the cooling (heating) air flows along the guide partition wall 310 in the longitudinal direction of both sides of the battery module 100, and the remaining cooling (heating) air flows into the inlet hole 122 of the lower plate 120 and flows to the rear through the space between the lower plate 120 and the lower frame 110 which are under the lower surface of the battery module 100. The lower surface of the battery module 100 contact with the cooling (heating) air through the plurality of heat exchange holes 126 formed in the lower plate 120, and thus is convection cooled (heated).

Subsequently, even though the cooling air which has cooled the lower surface of the battery module 100 rises through the outlet hole 124, the cooling air is blocked by the second shielding partition wall 139 and cannot flow directly to the exhaust fan 220.

As a result, the cooling (heating) air which has cooled respectively the both sides and lower surface of the battery module 100 joins at the rear side and rear of the battery module 100. The cooling (heating) air passes through the middle portion of the battery module 100 along the path of the guide partition wall 310, and moves to the front. Then, the cooling (heating) air is discharged to the exhaust fan 220 via the upper front path and side of the battery module 100.

Next, the outer upper frame 150 is installed on the outside of the inner upper frame 130 and fixed. The outer upper frame 150 has a box shape with open lower portion, front and rear thereof. A terminal through-hole 154 through which the +/−terminal 102 of the battery module 100 passes is formed on the upper surface of the outer upper frame 150.

The front of the outer upper frame 150 is finished by the front frame 140. The rear plate 160 is installed on the rear of the outer upper frame 150. The exhaust fan 220 is installed on the upper portion of the rear plate 160 so as to discharge the cooling (heating) air to the outside.

Meanwhile, it is desirable that a space (referred to as a front insulation space) of the control part installation portion 400, which is formed by the open front of the outer upper frame 150 and the front frame 140, a space (referred to as an upper insulation space) formed by the upper surface of the inner upper frame 130, the upper surface of the control part installation portion 400 of the front frame 140, and the inner upper surface of the outer upper frame 150, a space (referred to as a rear insulation space) formed by the rear of the inner upper frame 130 and the inner surface of the rear plate 160, and a space (referred to as a side insulation space) formed by both sides of the inner upper frame 130 and both inner sides of the outer upper frame 150 should be an enclosed space isolated from the outside respectively. This is because the spaces function as insulation. Here, so long as the spaces can function as insulation, the spaces are not necessarily enclosed spaces isolated completely from the outside.

Also, if it is intended to entirely or selectively increase the insulation effectiveness of the insulation spaces, it is required that a separate thermal insulating material (not shown) is filled in each insulation space.

Figure 7:
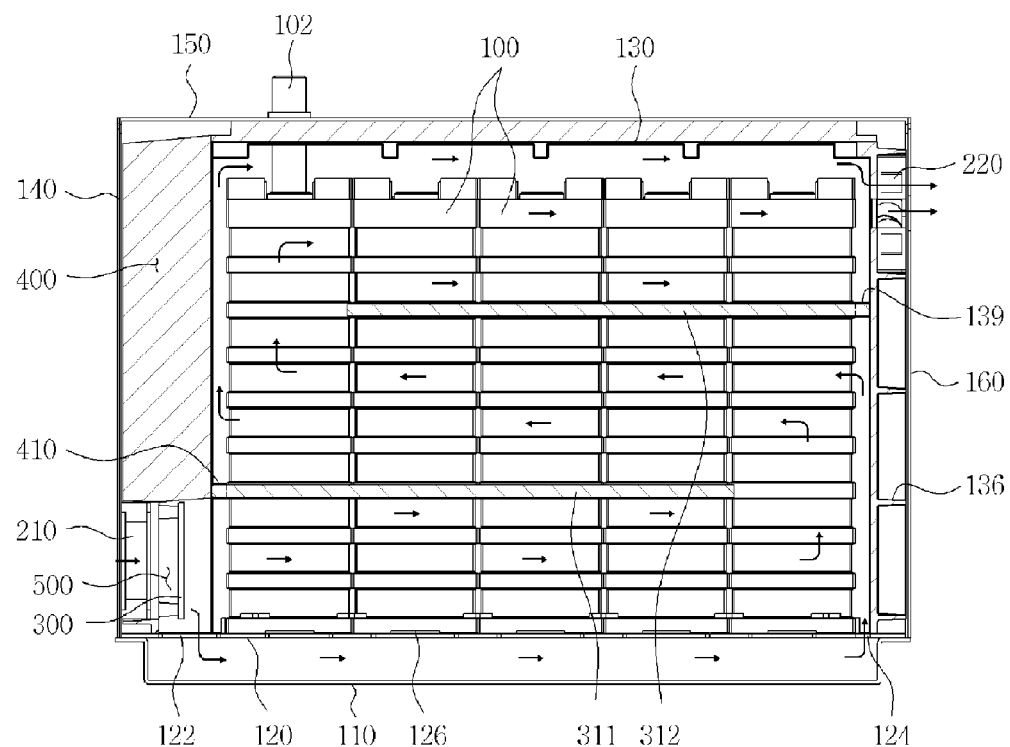
FIG. 7 is a cross sectional view showing a flow of the cooling (heating) air flowing in the battery case and the flow of the cooling (heating) air as viewed from the side of the battery case is shown in (a) and the flow of the cooling (heating) air as viewed from the top of the battery case is shown in (b).
Figure 7:
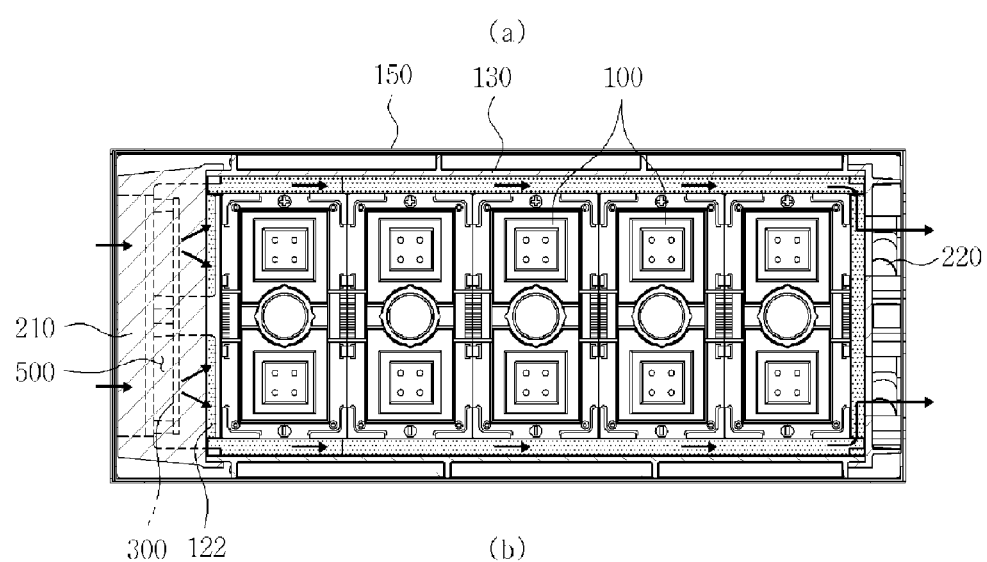

Up to now, the battery case 1000 according to the embodiment of the present invention has been described with reference to FIGS. 2 to 6. Hereafter, a process of cooling (heating) the battery module 100 by using the cooling (heating) air in the battery case 1000 will be described with reference to (a) and (b) of FIG. 7. For reference, the cooling (heating) air is indicated by arrows in (a) and (b) of FIG. 7.

First, when the temperature of the battery module 100 is out of an appropriate temperature range, a sensing means, for example, a sensor, provided on the control part installation portion 400 senses the temperature as an abnormal temperature, and thus, operates simultaneously or selectively the suction fan 210 and the exhaust fan 220, so that air is sucked into the battery case 1000 from the outside.

The air which has passed through the suction fan 210 comes into the impact cooling (heating) chamber 500, i.e., the space by the suction fan 210, the front of the battery module 100, and the lower surface of the control part installation portion 400, and then primarily impacts the front of the battery module 100 and cools or heats the battery module 100.

Here, when the sensing means provided on the control part installation portion 400 senses that the temperature of the battery module 100 is reduced below an appropriate temperature, the heater 300 is operated to heat the air sucked from the outside. Therefore, the air in a state where the heater 300 is not operated becomes cooling air, and the air in a state where the heater 300 is operated becomes heating air.

Continuously, a portion of the cooling (heating) air which has impacted the front of the battery module 100 and has cooled the lower front of the battery module 100 flows into the path formed between the sides of the inner upper frame 130 and the battery module 100 and the first guide partition wall 311, and then flows to the rear along both sides of the lower portion of the battery module 100 through the first side flow. Meanwhile, the remaining cooling (heating) air flows under the lower surface of the battery module 100 through the inlet hole 122 formed in the lower plate 120.

The cooling (heating) air which has moved to the rear along the lower side of the battery module 100 by the first guide partition wall 311 convection cools both sides of the lower portion of the battery module 100 while moving. The cooling (heating) air which has flowed into the inlet hole 122 of the lower plate 120 convection cools (heats) the lower surface of the battery module 100 through the plurality of heat exchange holes 126 formed in the lower plate 120 while flowing toward the rear of the battery module 100 through the path formed between the lower plate 120 and the lower frame 110. Then, the cooling (heating) air is discharged between the battery module 100 and the rear plate 160 through the outlet hole 124 of the lower plate and rises to the second guide partition wall 312, so that the rear of the battery module 100 is cooled (heated).

Also, the cooling (heating) air which has cooled both sides of the lower portion of the battery module 100 and the cooling (heating) air which has cooled (heated) the lower surface of the battery module 100 join with each other at the lower rear of the battery module 100 and convection cools (heats) both sides of the middle portion of the battery module 100 during the second side flow which means that the cooling (heating) air flows through the front of the battery module 100 along the path between the first guide partition wall 311 and the second guide partition wall 312.

Next, a portion of the cooling (heating) air, which has moved to the front of the battery module 100 after cooling (heating) both sides of the middle portion of the battery module 100 during the second side flow, cools (heats) the front middle portion and the upper portion of the battery module 100, and then convection cools (heats) the front middle portion and the upper surface of the battery module 100 during flowing toward the exhaust fan 220 along the path between the upper surface of the inner upper frame 130 and the upper surface of the battery module.

The remaining cooling (heating) air which has gone through the second side flow cools (heats) the upper side and rear of the battery module during the third side flow which means that the cooling (heating) air flows to the rear through the path among the second guide partition wall 312, the upper surface of the inner upper frame 130, and the upper side of the battery module 100. Then, the remaining cooling (heating) air is discharged to the outside through the exhaust fan 220.

As described above, according to the embodiment of the present invention, the present invention provides a structure in which the cooling (heating) air is capable of cooling (heating) the front, both sides, upper surface, lower surface and rear of the battery module 100, thereby more improving the cooling efficiency or heating efficiency.

While it has been described that the battery case according to the embodiment of the present invention has a structure in which a plurality of battery modules 100 are combined in series, the battery case can be also manufactured to have a structure in which the plurality of battery modules 100 are combined in series or in parallel.

The battery case according to the embodiment of the present invention is suitably used, in particular, in an electric vehicle or a hybrid vehicle. However, there is no limit to this. The battery case according to the embodiment of the present invention can be also applied to various technical fields using the battery module.

The present invention is not limited to the configuration of the foregoing embodiment. So long as the contents described in the claims are included, configurations which have been variously changed within the spirit of the present invention by those skilled in the art to which the present invention belongs should be also included in the present invention.

The invention claimed is:

1. A battery case comprising:
   a lower frame with an upper open part;
   a lower plate fixed to the lower frame for holding the battery module thereon, the lower plate being formed lengthwise with an inlet hole, an outlet hole, and a heat exchange hole;
   an inner upper frame with an upper surface having a terminal through-hole for enclosing the battery module;
   a front frame attached to an open front of the inner upper frame for holding a suction fan at the lower part thereof;
   an outer upper frame with an upper surface having a terminal through-hole for enclosing the inner upper frame and the front frame;
   a rear plate attached to the rear of the outer upper frame for holding an exhaust fan; and
   a guide partition wall arranged in the side of the inner upper frame so as to closely contact the battery module, characterized in that the guide partition wall guides cooling (heating) air sucked by the suction fan along a zigzag path from the lower part of the side of the battery module to the upper part thereof to the exhaust fan,
   wherein a portion of the cooling (heating) air sucked from the suction fan of the front frame flows to both sides of the battery module along the guide partition wall,
   and wherein the remaining cooling (heating) air flows into the inlet hole of the lower plate and flows to the rear through a space between the lower plate and the lower frame which are under the lower surface of the battery module.

2. The battery case of claim 1, wherein, when the side of the battery module is divided into a lower portion, a middle portion and an upper portion from the bottom to the top thereof, the guide partition wall comprises a first guide partition wall and a second guide partition wall, wherein the first guide partition wall separates the lower portion and the middle portion, and wherein the second guide partition wall separates the middle portion and the upper portion.

3. The battery case of claim 2, wherein the cooling (heating) air cools (heats) sequentially the side of the battery module through a first side flow, a second side flow, and a third side flow, wherein the first side flow is that the cooling (heating) air flows to the rear through a path among the first guide partition wall, the lower plate, and the lower side of the battery module, wherein the second side flow is that the cooling (heating) air which has gone through the first side flow flows from the rear side of the battery module to the front through a path between the first and second guide partition walls and the middle portion of the side of the battery module, and wherein the third side flow is that the cooling (heating) air which has gone through the second side flow flows from the front side of the battery module to the rear through a path among the second guide partition wall, the upper surface of the inner upper frame, and the upper side of the battery module.

4. The battery case of claim 2, wherein the longitudinal front end of the first guide partition wall is formed protruding more than the front of the battery module, wherein the longitudinal rear end of the first guide partition wall is spaced from the rear of the battery module at a certain interval, wherein the longitudinal rear end of the second guide partition wall is formed protruding more than the rear of the battery module, and wherein the longitudinal front end of the second guide partition wall is spaced from the front of the battery module at a certain interval.

5. The battery case of claim 2, wherein a portion of the cooling (heating) air sucked from the suction fan flows into a path between the lower plate and the lower frame through the inlet hole formed in the lower plate, and cools (heats) the lower surface of the battery module through the heat exchange hole, and wherein a portion of the cooling (heating) air flows into a path formed between the sides of the inner upper frame and the battery module and the first guide partition wall.

6. The battery case of claim 4, wherein the suction fan and a control part installation portion are formed on the upper portion and the lower portion respectively, wherein the rear of the control part installation portion is spaced from the front of the battery module, wherein a first shielding partition wall is formed on either the front frame or the control part installation portion, wherein a second shielding partition wall is formed on the inner rear of the inner upper frame, wherein the first shielding partition wall finishes closely between the protruding ends of the first guide partition wall, and wherein the second shielding partition wall finishes closely between the protruding ends of the second guide partition wall.

7. The battery case of claim 6, wherein the cooling (heating) air cools (heats) the lower front of the battery module in an impact cooling (heating) chamber which is formed by the rear of the suction fan, the first shielding partition wall, and the front of the battery module, and wherein the cooling (heating) air which has cooled (heated) the lower front of the battery module goes through the first side flow and passes through the inlet hole of the lower plate, and then cools (heats) the lower side and lower surface of the battery module.

8. The battery case of claim 7, wherein the cooling (heating) air which has cooled (heated) the lower surface of the battery module is discharged between the battery module and the rear plate through the outlet hole of the lower plate, and then rises to the second guide partition wall, so that the rear of the battery module is cooled, and wherein the cooling (heating) air which has cooled (heated) the lower side of the battery module joins with the cooling (heating) air rising through the outlet hole of the lower plate, and then goes through the second side flow along a path between the first guide partition wall and the second guide partition wall.

9. The battery case of claim 8, wherein a portion of the cooling (heating) air which has gone through the second side flow cools (heats) the front middle portion and the upper portion of the battery module, and then flows to the rear along a path between the upper surface of the inner upper frame and the upper surface of the battery module, and wherein a portion of the cooling (heating) air which has gone through the second side flow goes through the third side flow to the upper side of the battery module.

10. The battery case of claim 9, wherein the cooling (heating) air which has gone through the third side flow cools the upper side and rear of the battery module, and then is discharged through the exhaust fan.

11. The battery case of claim 3, wherein the longitudinal front end of the first guide partition wall is formed protruding more than the front of the battery module, wherein the longitudinal rear end of the first guide partition wall is spaced from the rear of the battery module at a certain interval, wherein the longitudinal rear end of the second guide partition wall is formed protruding more than the rear of the battery module, and wherein the longitudinal front end of the second guide partition wall is spaced from the front of the battery module at a certain interval.

12. The battery case of claim 3, wherein a portion of the cooling (heating) air sucked from the suction fan flows into a path between the lower plate and the lower frame through the inlet hole formed in the lower plate, and cools (heats) the lower surface of the battery module through the heat exchange hole, and wherein a portion of the cooling (heating) air flows into a path formed between the sides of the inner upper frame and the battery module and the first guide partition wall.

* * * * *